A. V. ST. ARMANDE.
MULTICELL ELECTRIC BATTERY.
APPLICATION FILED FEB. 15, 1918.

1,277,147.

Patented Aug. 27, 1918.

INVENTOR:
A. V. St. ARMANDE
BY: *[signature]*
ATTORNEY.

UNITED STATES PATENT OFFICE.

ARTHUR V. ST. ARMANDE, OF PAISLEY, SCOTLAND.

MULTICELL ELECTRIC BATTERY.

1,277,147.          Specification of Letters Patent.     Patented Aug. 27, 1918.

Application filed February 15, 1918.   Serial No. 217,318.

*To all whom it may concern:*

Be it known that I, ARTHUR VILLIERS ST. ARMANDE, a subject of the King of the United Kingdom of Great Britain and Ireland, and residing at Paisley, Renfrewshire, Scotland, have invented a certain new and useful Improvement in Multicell Electric Batteries, of which the following is a specification.

It is experienced that electric batteries comprising a plurality of cylindrical cells disposed end to end, as used, for example, for torches and pocket lamps, frequently become useless due to separation of the contacts.

It is the object of the present invention to obviate this drawback.

Broadly, the invention consists in shrinking on to the cells a wrapper of insulating or waterproofing material such for example as celluloid.

Such a wrapper serves to maintain the cells in permanent contact relation.

In practice, I may wrap around the series of cells to be maintained in contact relation, or around the abutting ends of such cells, a sheet or strip of the celluloid moistened with a softening agent or solvent, such as acetone or amyl acetate, such wrapper sheet shrinking when dry so that it forms a skin or envelop inseparable from the cells.

Alternatively, I may heat such a sheet, wrap it around the cells while still warm, and join the overlapping ends by means of solvent or adhesive; or I may coat the ordinary wrapper with a solution of cellulose acetate or nitro-cellulose which, as it dries, effects the required shrinkage of the wrapper.

Figure 1:
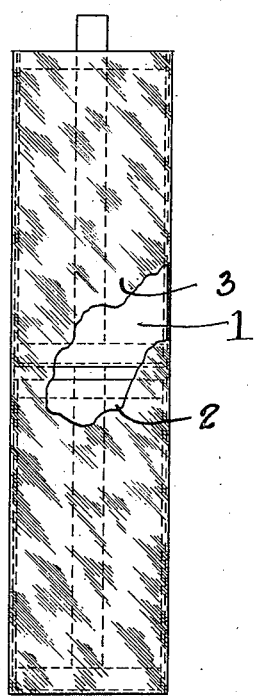
Figure 2:
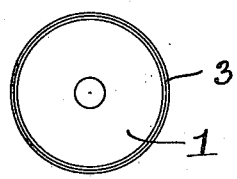

Figure 1 of the accompanying drawing is an elevation and Fig. 2 a plan illustrating diagrammatically a multi-cell battery according to the invention.

As shown, 1 and 2 denote the cells which are disposed end to end and enveloped by a shrunk-on wrapper 3 of celluloid.

What I claim is:—

The improvement in the manufacture of multi-cell electric batteries consisting in shrinking a wrapper on to a series of cells disposed end to end so as to envelop the abutting ends.

In testimony whereof I have signed my name to this specification in the presence of two subscribing witnesses.

A. V. ST. ARMANDE.

Witnesses:
 HENRY MASON,
 FLORENCE HOUSTON.